United States Patent [19]
Bauman

[11] Patent Number: 6,046,979
[45] Date of Patent: Apr. 4, 2000

[54] METHOD AND APPARATUS FOR CONTROLLING THE FLOW OF VARIABLE-LENGTH PACKETS THROUGH A MULTIPORT SWITCH

[75] Inventor: James A. Bauman, San Jose, Calif.

[73] Assignee: Cabletron Systems, Inc., Rochester, N.H.

[21] Appl. No.: 09/072,148

[22] Filed: May 4, 1998

[51] Int. Cl.[7] .................................................... H04J 3/14
[52] U.S. Cl. ........................ 370/229; 370/252; 370/389; 370/468
[58] Field of Search .................................... 370/229, 230, 370/232, 233, 234, 235, 236, 252, 389, 397, 399, 409, 412, 413, 468, 253, 414

[56] References Cited

U.S. PATENT DOCUMENTS

| | | | |
|---|---|---|---|
| 5,313,454 | 5/1994 | Bustini et al. | 370/236 |
| 5,381,407 | 1/1995 | Chao | 370/60 |
| 5,412,647 | 5/1995 | Giroux et al. | 370/60 |
| 5,524,006 | 6/1996 | Hluchyj et al. | 370/84 |
| 5,530,695 | 6/1996 | Dighe et al. | 370/17 |
| 5,533,020 | 7/1996 | Byrn et al. | 370/412 |
| 5,579,312 | 11/1996 | Regache | 370/399 |
| 5,592,476 | 1/1997 | Calamvokis et al. | 370/413 |
| 5,666,353 | 9/1997 | Klausmeier et al. | 370/230 |
| 5,864,540 | 1/1999 | Bonomi et al. | 370/413 |

*Primary Examiner*—Douglas W. Olms
*Assistant Examiner*—Shick Hom
*Attorney, Agent, or Firm*—Law Offices of Mark A. Wilson; Mark A. Wilson

[57] ABSTRACT

A method and apparatus for controlling the flow of variable-length packets to a multiport switch involve accessing forwarding information in a memory based at least partially on layer 4 information from a packet and then forwarding the packet only if the packet is within a bandwidth consumption limit that is specified in the forwarding information. In a preferred embodiment, a credit bucket algorithm is used to ensure that packet flows are within specified bandwidth consumption limits. The preferred method for implementing the credit bucket algorithm to control flows of packets involves first receiving a particular packet from a flow and then stripping the layer 2 header information from the packet. The layer 3 and layer 4 information from the packet is then used to look-up flow-specific forwarding and flow control information in a memory that stores a linked list of table entries that includes the fields necessary to implement the credit bucket algorithm. The credit bucket algorithm is implemented in embedded devices within an application-specific integrated circuit, allowing the control of packet flows based on the application of the flow.

19 Claims, 8 Drawing Sheets

METHOD AND APPARATUS FOR CONTROLLING THE FLOW OF VARIABLE-LENGTH PACKETS THROUGH A MULTIPORT SWITCH

TECHNICAL FIELD

The invention relates generally to the management of packet flows in a network that transfers variable-length packets, for instance an ether net-based network. More particularly, the invention relates to controlling packet flows based on application protocol information.

BACKGROUND OF THE INVENTION

Data networks have typically been connection less networks that transfer data traffic in bursts of packets, where the packets within the bursts are not necessarily transported in sequential order. Voice and video networks have typically been connection-based networks that stream data from a source to a destination in precise sequential order. The growth in popularity of the Internet has created a demand for networks that can efficiently deliver data, voice, and video with a quality of service that satisfies speed and reliability requirements.

Figure 1:
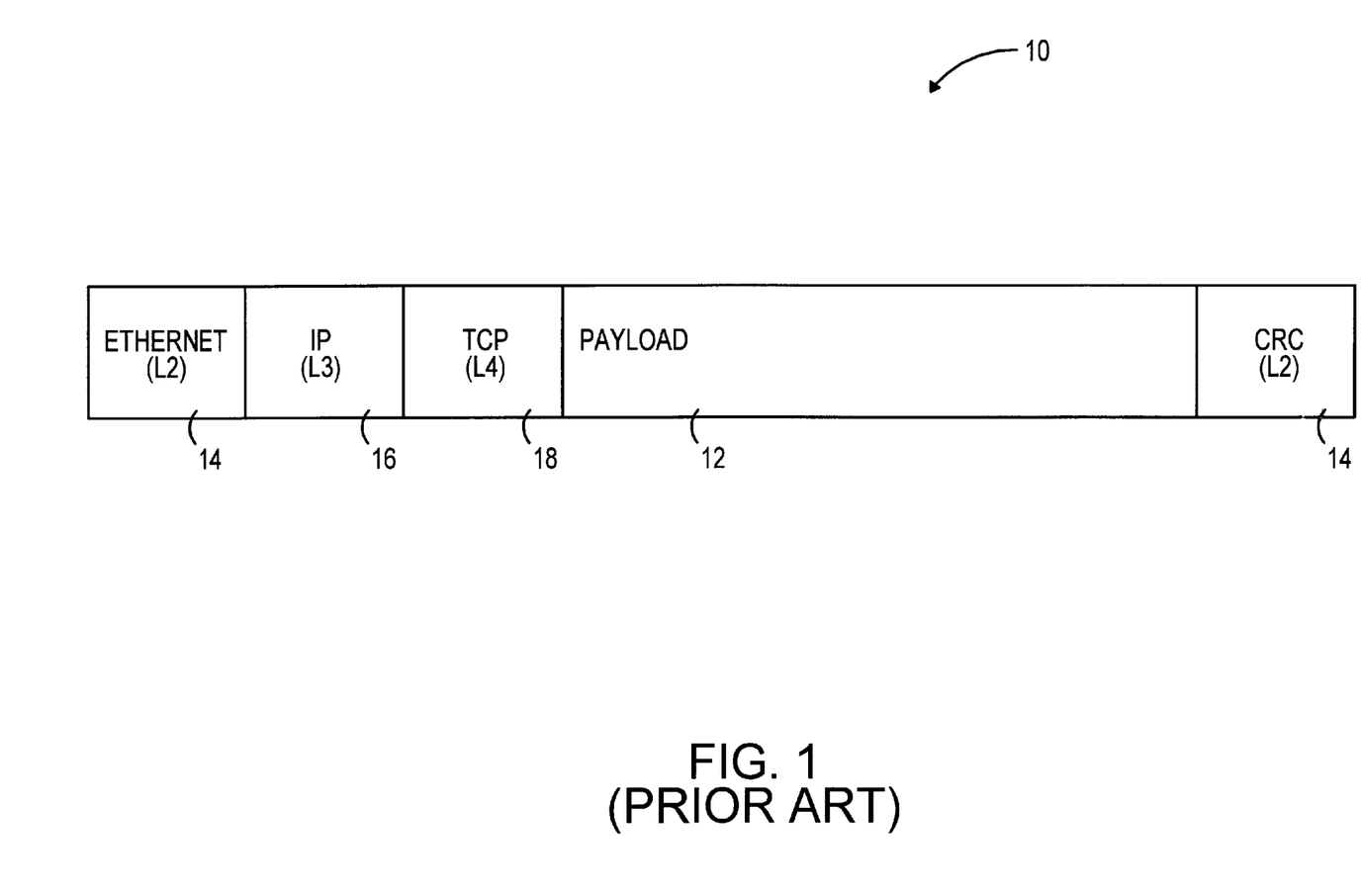
FIG. 1 is a depiction of an ethernet packet with a variable-length payload that includes header information from the ethernet, the IP, and the TCP protocols in accordance with the prior art.

In the data networking arena, the Transmission Control Protocol and the Internet Protocol (TCP/IP) suite is becoming the most widely accepted and utilized network protocol. TCP/IP allows for the transmission of variable-length packets and it is commonly utilized in conjunction with the ethernet protocol. The ethernet protocol functions at layer 2 (the data link layer) of the OSI model, while IP functions at layer 3 (the network layer) and TCP functions at layer 4 (the transport layer). FIG. 1 is a depiction of an ethernet packet 10 with a variable-length payload 12 that includes header information relevant to the ethernet 14 (layer 2), the IP 16 (layer 3), and the TCP 18 (layer 4) protocols.

Although TCP/IP has become an increasingly popular protocol suite, TCP/IP is connection less and TCP/IP allows for the transfer of variable-size data packets. This makes TCP/IP more difficult to use for transmitting quality voice and video data streams from a source to a destination than connection-based protocols such as ATM which use fixed cell sizes. In order to improve the ability of TCP/IP-based networks to effectively transmit voice, video, and other transmission-critical packet flows, and in order to police bandwidth consumption, network devices need to have the ability to control network traffic based on various critical flow parameters. Specifically, network devices need to be able to control network traffic on a flow-by-flow basis, where a "flow" is defined as a sequence of data packets transmitted from a first host to a second host for the purpose of running one specific application. Improvements in traffic control can be achieved by managing packet flows based on OSI layer 4 information.

Layer 4 (the transport layer) of the OSI model is responsible for end-to-end communications between devices, such as coordinating the communications between network sources and destinations. The transport layer is where the TCP and the User Datagram Protocol (UDP) information reside in an IP protocol stack. At the transport layer, the TCP and UDP headers include port numbers that uniquely identify which application protocol (e.g., FTP, Telnet, SMTP, HTTP, NNTP, SNMP, etc.) is relevant to a given packet. Receiving-end computer systems use the application protocol information to interpret data contained in packets. Specifically, the port numbers in TCP/UDP headers enable a receiving-end computer system to determine the type of IP packet it has received and to hand the packet off to the appropriate higher layer software.

Figure 2:
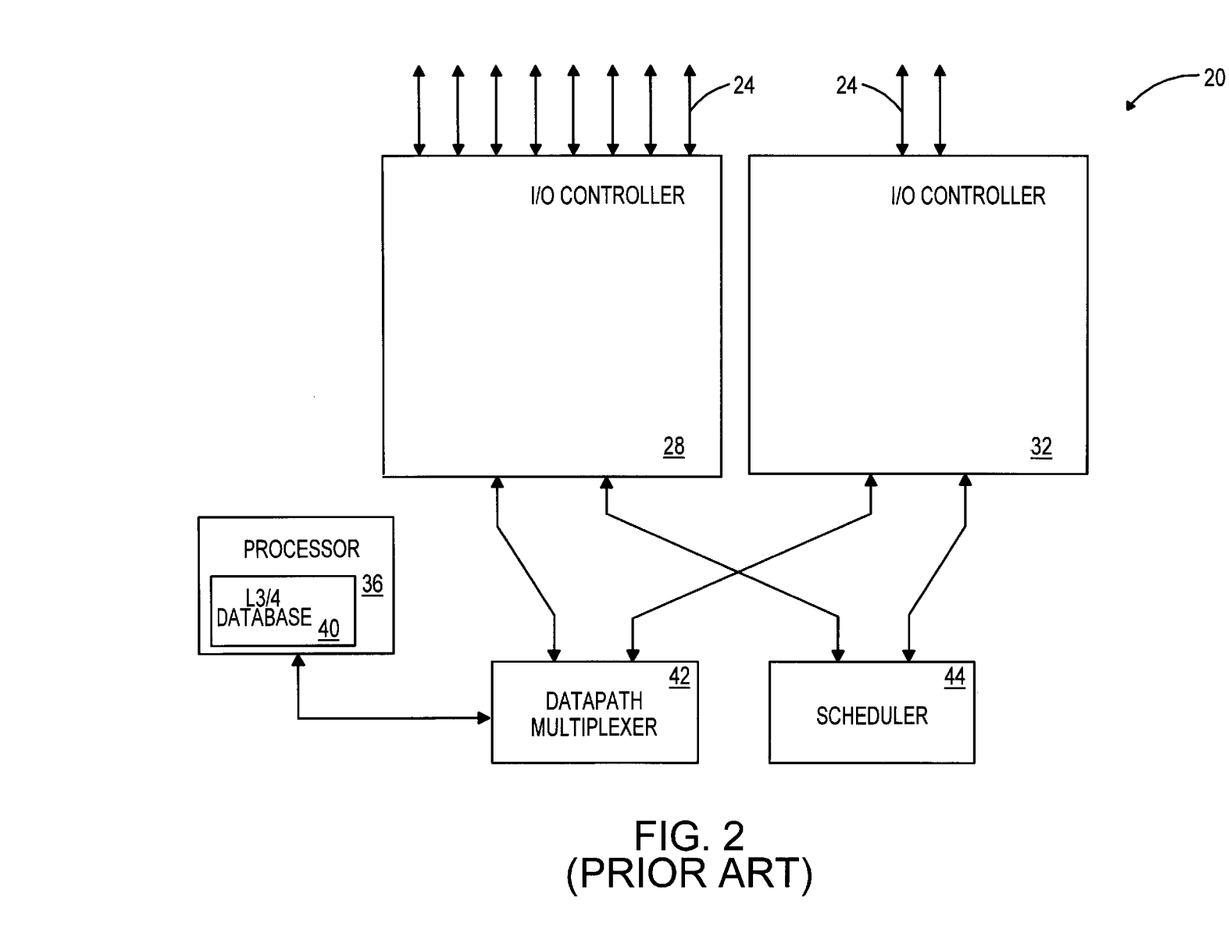
FIG. 2 is a depiction of a network device that utilizes a multi-purpose processor and application-specific software to perform layer 3 and/or layer 4 look-ups in accordance with the prior art.

Prior art devices control network traffic based on application information by sending the TCP/IP header information from each packet to a central processing unit that applies software-based look-up tables to determine the application protocol that is present and to determine which, if any, application-specific traffic controls apply to the packets. FIG. 2 is a depiction of a network device 20 that includes a data path multiplexer 42, a scheduler 44, and ten data links 24 connected to two input/output (I/O) controllers 28 and 32. When packets are received at the I/O controllers, some or all of the packet data is sent to the central processor 36, which must extract the TCP/IP header information. The central processor then accesses layer 3 and/or layer 4 databases 40 to obtain, among other things, application protocol information. Based on the layer 3 and layer 4 information, flow controls can be applied to a flow of packets on a packet-by-packet basis. The main disadvantage of the architecture as depicted in FIG. 2 is that the look-up and traffic control processes are slow relative to the available bandwidth of the data links, such as twisted pair wires and optical fibers, that are attached to the network device, because the processes are performed by a multi-purpose processor and application-specific software. As a result, bottlenecks that degrade overall network performance may be created during the time required to complete software-based look-ups. Bottlenecks can cause unacceptable delays in mission-critical applications such as order entry or time-sensitive applications such as video teleconferencing.

Another approach to network traffic control is disclosed in U.S. Pat. No. 5,381,407, entitled "Method and System for Controlling User Traffic to a Fast Packet Switching System," issued to Chao. Chao is an asynchronous transfer mode (ATM) specific method and system that applies a well known leaky bucket algorithm to control the flow of 53-byte fixed-length packets in a computer network. The leaky bucket algorithm involves a "bucket" that is large enough to store bursts of multiple packets incoming to the bucket. Regardless of the rate of packets incoming to the bucket, packets are released from the bucket at a controlled rate that is dictated by the availability of credits. Whenever a credit is available, a corresponding number of packets are released. The flow of packets is controlled by controlling the supply of credits. A disadvantage of the Chao method and apparatus is that it is specific to ATM-based networks that transfer only fixed-length cells. Accordingly, the supply of credits is based solely on information from a virtual channel identifier (VCI) that is specific to the ATM protocol and associated with each packet. The VCI is not compatible with variable-length protocols such as ethernet. Because Chao relies on the VCI to control user traffic, the Chao approach is not applicable to TCP/IP networks that utilize a layer 2 (datalink layer) protocol such as ethernet.

In light of the performance problems of prior art devices that access application protocol information in a central processor and the incompatibility of ATM-based traffic control systems, what is needed is an improved method and apparatus that control network traffic to a specified quality of service by utilizing application protocol information as supplied by the transmission control protocol.

SUMMARY OF THE INVENTION

A method and apparatus for controlling the flow of variable-length packets to a multi port switch involve accessing forwarding information in a memory based at least partially on the application associated with the flow of packets and then forwarding packets from the flow only if the packets are within a bandwidth consumption limit that is specified in the forwarding information. In a preferred embodiment, a credit bucket algorithm is used to ensure that packet flows are within specified bandwidth consumption limits.

The preferred method for implementing the credit bucket algorithm to control flows of packets involves first receiving a particular packet from a flow and then stripping the layer 2 header information from the packet. The layer 3 and layer 4 information from the packet is then used to look-up flow-specific forwarding and flow control information in a memory that stores a linked list of table entries. In addition to conventional layer 3 routing information, table entries in the memory include layer 4 application protocol information in addition to various fields that are specific to implementing the credit bucket algorithm. The information fields utilized to implement the credit bucket algorithm include an enable vector, a priority vector, a violated vector, a time_select vector, a time_stamp vector, a credit_bucket vector, and a credit_refresh vector.

The time_select field is preferably a 4-bit vector that identifies significant bits on a system counter. In the preferred embodiment, the system counter is a 45-bit vector that counts clock periods from a 50 MHz clock. The time_select field identifies one of eleven different groups of consecutive bits from the system counter. Each one of the eleven different counter groups represents a time interval of a different duration, depending on which bits are selected from the 45-bit counter. The eleven different counter groups are staggered by two orders of magnitude (i.e., 2 bits) and therefore, the time intervals increase by a multiple of 4 between each higher level counter group.

The time_stamp field is preferably a 10-bit vector that identifies the last time a particular table entry in the memory was accessed. The time_stamp of each table entry is updated with significant bits from the clock counter each time a table entry for a particular flow is accessed.

The credit_bucket field is preferably a 14-bit vector that identifies how many 32-byte switching blocks from an associated flow can be transmitted in a current time interval. Each time a 32-byte switching block is transmitted, a credit is deducted from the credit_bucket associated with the particular flow. Packets from the particular flow are released as long as enough credits are available in the associated credit_bucket. When there are not enough credits in the associated credit_bucket to release a packet, the packet is dropped from the switch or lowered in priority, depending on whether or not the flow control feature is active. The credit_bucket is refreshed to a credit_refresh value whenever the pre-established time interval for a flow has expired.

The credit_refresh field is preferably a 12-bit vector that identifies the value that is used to refill the credit bucket after the expiration of the pre-established time interval. Because the credit_refresh field is a 12-bit vector, the credit_refresh value can be one of 212 or 4,096 different values, where each credit_refresh value has a minimum resolution of four switching blocks and where each switching block contains 32 bytes.

After a table entry for a particular flow has been identified in the look-up step, in a next step, the time_select field is used to obtain a timer value from the 45-bit system counter. To obtain a timer value, the 4-bit time_select vector is fed into a multiplexer that enables the identification of one of the eleven timer value groups. The time interval represented by the time_select vector is based on the position of the selected bits in the 45-bit system counter.

In a next step, the newly acquired timer value is compared to the time stamp that was obtained from the table entry. Since the time_select vector identifies significant bits of the system counter, when the timer_value and time stamp are not equal, it is determined that the pre-established time interval has expired. On the other hand, if the timer_value and time_stamp are equal, it is determined that the pre-established time interval has not expired.

If the timer value obtained using the time_select is equal to the time_stamp from the table entry, indicating the current time interval has not expired, then the size of the packet that initiated the look-up process is subtracted from the size of the credit_bucket that was obtained from the table entry. On the other hand, if the timer_value is not equal to the time_stamp, indicating that the current time interval has expired, then the number of credits available in the credit_bucket is updated or "refreshed" to the credit refresh value that was obtained from the table entry and then the size of the packet that initiated the look-up process is subtracted from the size of the credit_bucket. If the subtracted value of the credit_bucket is greater than or equal to zero, the packet is forwarded on to be processed through the multi port switch. An updated credit_bucket value is then sent back to the table entry to be utilized for additional packets from the same flow. If, on the other hand, the subtracted credit_bucket value is less than zero, the entire packet is dropped from the switch or tagged with a lower priority, depending on the setting of a priority vector that was accessed in the look-up process.

In the preferred embodiment, functions described with reference to the preferred method are performed in an application-specific integrated circuit having embedded logic devices such as multiplexers, comparitors, adders, and subtractors that are arranged to perform the specific functions.

Utilizing the basic approach described above, flow control, or bandwidth policing, can be fine tuned by adjusting one or both of the time_select value and the credit_refresh value. For example, if the time interval as dictated by the time_select vector is short, the credit bucket will be refreshed more often and more packets can be released. Similarly, if the credit-refresh value is increased, then the number of credits available for the time interval will increase and, consequently, more packets can be released. Having a system that allows two degrees of freedom of adjustability enables the system to dictate different types of flow characteristics.

An advantage of the invention is that a few carefully chosen bits in memory can be used to implement a credit bucket algorithm at wire speed that allows selectable control of packet transmission rates. In addition, the memory contains information concerning the layer 4 application protocol port number. Since the application protocol information is accessible at data link speeds, flows through the multi port switch can be controlled based on specific layer 4 application protocol information in addition to all of the traditional layer 3 parameters at data link speeds. Accordingly, the switch is able to differentiate between applications when performing routing decisions. For example, traffic for a mission-critical application (i.e., SAP R/3, Peoplesoft, Baan, or custom developed client/server applications) can be assigned different forwarding rules, or rate limits, than HTTP-based internet traffic, even if they both need to travel across the same set of switch/router interfaces.

DETAILED DESCRIPTION

Figure 3:
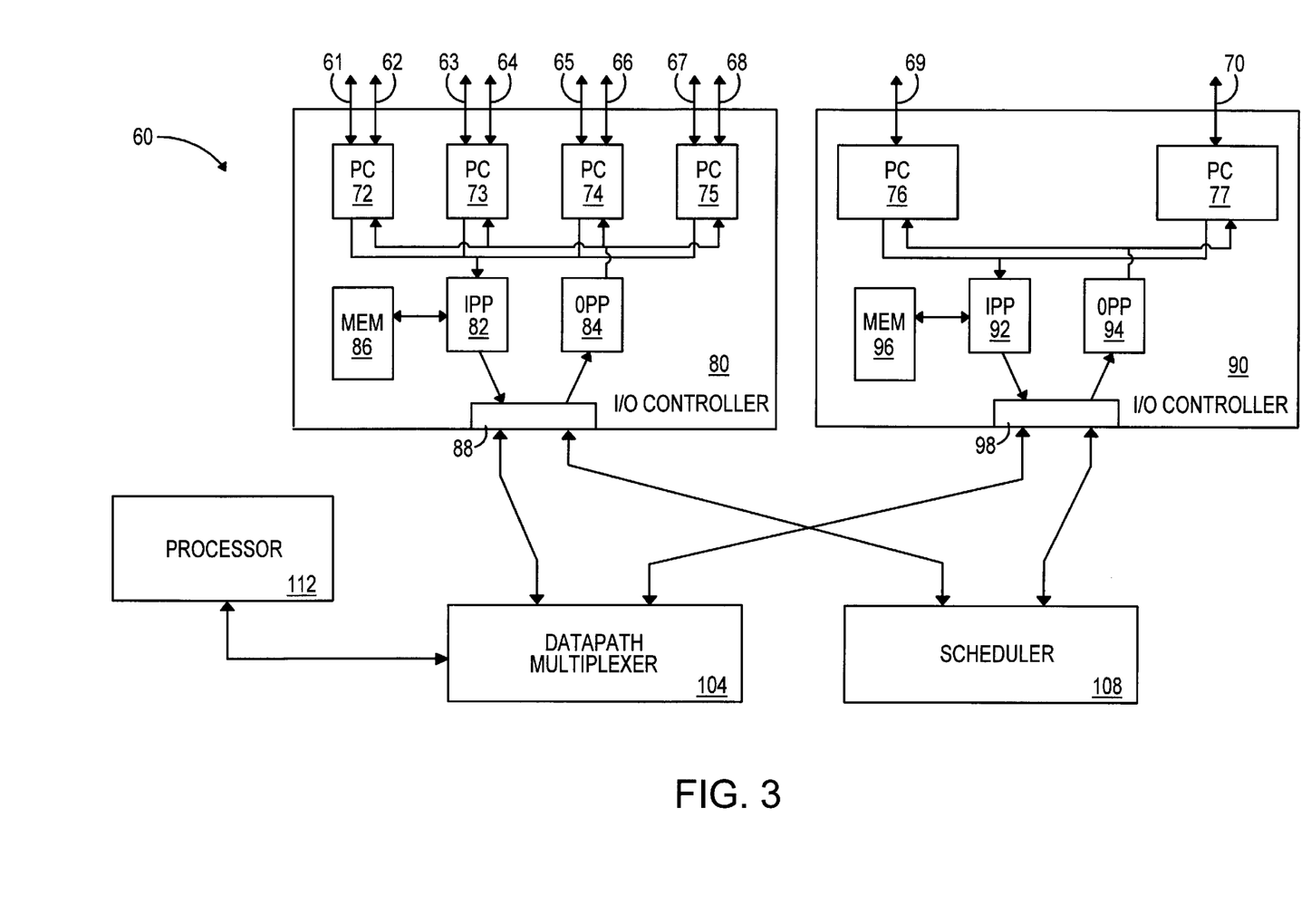
FIG. 3 is a depiction of a preferred architecture of a network device for controlling the flow of packets that utilizes a memory in accordance with the invention.

FIG. 3 is a depiction of the preferred architecture of a network device 60 for controlling network traffic. Specifically, the network device is a multi port switch that operates according to a frame-based protocol, preferably the ethernet protocol, at layer 2 (the datalink layer). At layer 3 (the network layer) and layer 4 (the transport layer), the system preferably handles data according to TCP/IP, although it may be compatible with other protocols such as internet packet exchange (IPX) and UDP.

In the preferred switch, data links 61, 62, 63, 64, 65, 66, 67, 68, 69, and 70 are connected to input/output port controllers (PCs) 72, 73, 74, 75, 76, and 77 at a port density that is related to the bandwidth capacity of the data links. For example, data link pairs (61/62, 63/64, 65/66, and 67/68) are connected to each of four port controllers 72, 73, 74, and 75 contained within I/O controller 80. The data link pairs 61–68 may include twisted pair wires and/or single or double-mode optical fibers that have a bandwidth of 10 and/or 100 Megabits per second (Mbps). In the other example, data links 69 and 70 are connected to respective port controllers 76 and 77 contained within I/O controller 90. The data links 69 and 70 are preferably single or multi-mode optical fibers that have a bandwidth of 1,000 Mbps or 1 Gigabit per second (Gbps). Although the switch is shown as having only a two-channel switch fabric and ten ports, it may likely have more channels in the switch fabric (e.g., four, eight, or sixteen) and more ports (i.e., 32, 64, or 128). In addition, the exact configuration and bandwidth of the data links is not critical to the invention. For example, the data links can also be non-physical links such as infrared or radio frequency data links.

Preferably, the port controllers 72–77 are application-specific integrated circuit (ASICS) that perform functions such as receiving incoming packets and parsing or stripping layer 2, layer 3, and layer 4 header information from incoming packets. The port controllers may also perform layer 2 look-ups, buffer incoming or outgoing packets, and/or manage the traffic between external buffers (not shown).

Packets that are ready to be switched and header information that is stripped from incoming packets at the port controllers 72–77 are transmitted to the input packet processors (IPPs) 82 and 92. The IPPs are ASICs that perform various functions such as segmenting incoming variable-sized packets into fixed-length switching blocks and buffering the blocks before they are forwarded through the data path multiplexer 104. The IPPs also manage various traffic control functions which are the focus of the present invention and which will be discussed in detail below.

The output packet processors (OPPs) 84 and 94 are ASICs that manage the flow of switching blocks from the data path multiplexer 104 and the flow of packets to the port controllers 72–77. One function of the OPPs is to reconnect switching blocks received from the data path multiplexer into the original packets before the packets are forwarded out of the switch.

The data path multiplexer 104 provides the physical paths for the transfer of switching blocks between different I/O controllers 80 and 90 and ultimately different data links 61–70. The preferred data path multiplexer is an integrated circuit that has the ability to unicast or multicast packets. In the preferred embodiment, the data path multiplexer is a multipoint switch, although in another embodiment the data path multiplexer can be a cross-point switch. The type of data path multiplexer is not critical to the invention.

The scheduler 108 is a device that utilizes information specific to each switching block to manage traffic through the data path multiplexer 104 in a manner that maximizes the throughput of switching blocks without unfairly delaying certain blocks. Information utilized by the scheduler includes the destination of the switching block, the relative age of the switching block, and the priority level of the switching block.

The data paths between the IPPs 82 and 92, OPPs 84 and 94, the data path multiplexer 104, and the scheduler 108 are connected to various conventional connectors that are depicted by elements 88 and 98. The connectors are not critical to the invention.

The processor 112 is a conventional multifunction processor that performs various ancillary tasks for the multi port switch 60. For example, the processor updates look-up tables based on information learned from surrounding network devices and past flow patterns. In many instances, the processor is supported by application-specific software that provides the algorithms needed to perform specific tasks.

A memory (MEM) 86 and 96 is operationally connected to each of the IPPs 82 and 92. The memories are preferably dynamic random access memory (DRAM) integrated circuits that enable rapid access to a linked list of layer 3 and layer 4 protocol information. The linked list of layer 3 and layer 4 protocol information is referred to as the L3/L4 Table. The L3/L4 Table consists of multiple linked table entries which contain information including bandwidth management information that is specific to a flow of packets, where a flow of packets, or simply a "flow," is a sequence of packets transmitted from a first host to a second host for the purpose of running one specific application.

Figure 4:
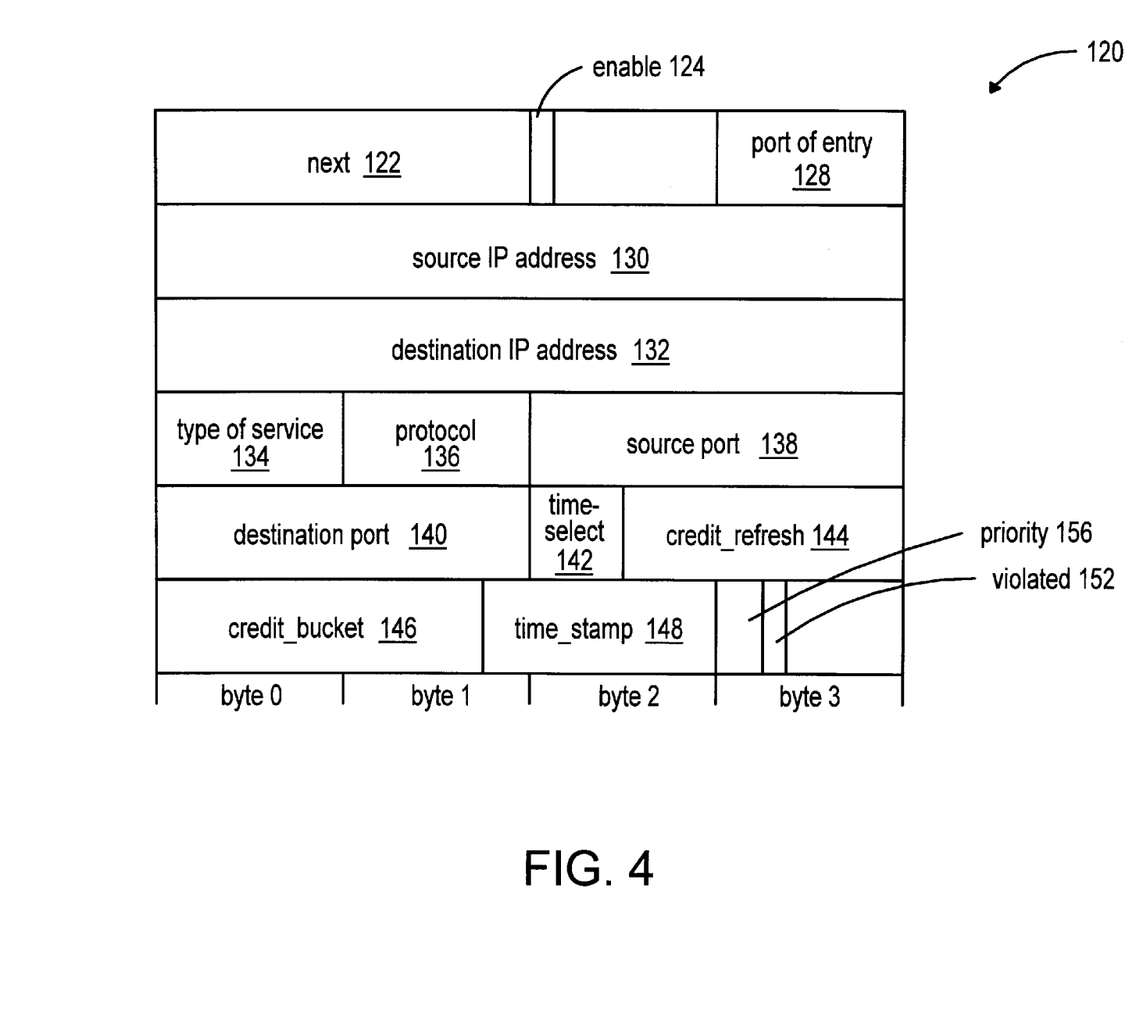
FIG. 4 is an expanded view of a preferred L3/L4 table entry that is stored in the memory of FIG. 3.

FIG. 4 is an expanded view of one entry 120 in a preferred L3/L4 Table. The L3/L4 Table entry includes standard TCP/IP fields as well as fields that are specific to bandwidth management. Fields in the L3/L4 Table that come from the standard layer 3 IP header are the source IP address 130, the destination IP address 132, the type of service field 134, and the protocol field 136. The source and destination addresses are 32-bit addresses that identify the source and destination of packets. The type of service field is an 8-bit field that identifies characteristics of a flow, such as delay sensitivity, high throughput, and high reliability. The protocol field is an 8-bit field that identifies the layer 4 protocol (e.g., TCP or UDP) for the data in an associated packet.

Data fields in the L3/L4 Table that are taken from the layer 4 TCP or UDP header include the source port 138 and the destination port 140. The port numbers are important because they uniquely identify which application protocol (e.g., FTP, Telnet, SMTP, HTTP) a packet follows. Port numbers between 1 and 255 have been reserved for what is known as the "well known" ports. The well known port numbers are the same in all host TCP/IP protocol networks. Table 1 provides examples of some of the well known port numbers and corresponding application protocols. In addition to the well known port numbers, standard Unix services are assigned port numbers in the 256 to 1,024 range. Custom developed applications are typically assigned port numbers above 1,024.

TABLE 1

EXAMPLES OF "WELL-KNOWN" PORT NUMBERS

| Application Protocol | Port Number |
| --- | --- |
| FTP | 20 (data) |
|  | 21 (control) |
| TELNET | 23 |
| SMTP | 25 |
| HTTP | 80 |
| NNTP | 119 |
| SNMP | 161 |
|  | 162 (SNMP traps) |

Other fields that are provided in the L3/L4 Table for bandwidth management in accordance with a preferred embodiment of the invention include the next field 122, the enable field 124, the port of entry field 128, the time_select field 142, the credit_refresh field 144, the credit_bucket field 146, the time_stamp field 148, the priority field 150, and the violated field 152. Each field is unique to the invention and is discussed individually. The next field is a 16-bit field that points to the next table entry in the linked list L3/L4 Table. The port of entry field is an 8-bit field that identifies the port on which the packet arrived.

The following fields are utilized to implement the credit bucket algorithm in accordance with a preferred embodiment. The enable field 124 is a 1-bit field that identifies whether or not the traffic control features of the switch are enabled for the particular flow. If the enable bit is set to "1," the traffic control, or bandwidth policing, features are active.

The time_select field 142 is a 4-bit field that identifies significant bits on a system counter. In the preferred embodiment, the system counter, or timer, is a 45-bit vector that counts clock periods from a 50 MHz clock.

The time_select field identifies one of eleven different groups of consecutive bits from the 45-bit system counter. Each one of the eleven different counter groups represents a time interval of a different duration, depending on which bits are selected from the 45-bit counter. The eleven different counter groups are staggered by two orders of magnitude (i.e., 2 bits) and, therefore, the time intervals increase by a multiple of four between each higher level counter group. Although the time_select field is 4 bits and identifies eleven counter groups, the exact number of bits and the exact number of counter groups are not critical to the invention.

Skipping down, the time_stamp field 148 is a 10-bit field that identifies the last time a table entry from a particular flow was accessed. The time_stamp of each table entry is updated with significant bits from the system counter each time a table entry for a particular flow is accessed.

The credit_bucket field 146 is a 14-bit field that identifies how many 32-byte switching blocks from an associated flow can be transmitted in the current time interval. Each time a 32-byte switching block is transmitted, a credit is deducted from the associated credit_bucket and as a result the credit bucket reflects a maximum sized packet that can be transmitted at any time. Packets from a particular flow are released as long as enough credits are available in the associated credit_bucket. When there are not enough credits in the associated credit_bucket to release a packet, the packet is dropped from the switch or lowered in priority, depending on a priority field setting. The credit bucket is refreshed to a credit_refresh value whenever the pre-established time interval for the flow has expired. In the preferred embodiment, the credit_bucket counts in 32-byte switching blocks, although it is not critical to the invention.

The credit_refresh field 144 is a 12-bit field that identifies the value that is used to "refresh" the credit bucket after the expiration of a designated time interval. Because the credit_refresh field is two bits smaller than the credit_bucket field 146, the credit_refresh value has a minimum resolution of four switching blocks, where each switching block contains 32 bytes. The credit_refresh field reflects a maximum sized packet that can be transmitted in an entire time interval. Although specific bit lengths are identified, other bit lengths can be used while balancing the tradeoffs between more accuracy with more bits or less accuracy with fewer bits.

The priority field 150 is a 2-bit field that determines whether a packet will be dropped from the switch or lowered in priority when the packet encounters a credit bucket that does not have sufficient credits to release the packet. If the bandwidth policing feature is enabled and the credit limit is reached, when the priority field is set to "11," the violating packet will be dropped from the flow. If the priority field is set to something other than "11," the packet will be tagged such that the priority of the packet will be lowered before it is forwarded through the switch, thereby limiting the ability of the packet to be forwarded during high traffic periods.

The violated field 152 is a 1-bit field that identifies whether the bandwidth limit of a particular packet flow has ever been violated. The violated bit can be used for network analysis and is reset periodically by software.

In operation, when an incoming packet enters the switch 60 of FIG. 3 on one of the data links 61–70, the layer 2 header information is stripped from the incoming packet by the corresponding port controller 72–77. The layer 3 and layer 4 header information is then utilized by the corresponding IPP 82 and 92 to generate a search index vector that allows the L3/L4 Table to be rapidly searched for matching L3/L4 Table entries. The method used to generate the search index vector and the method used to search the L3/L4 Table are not critical to the invention.

Figure 5:
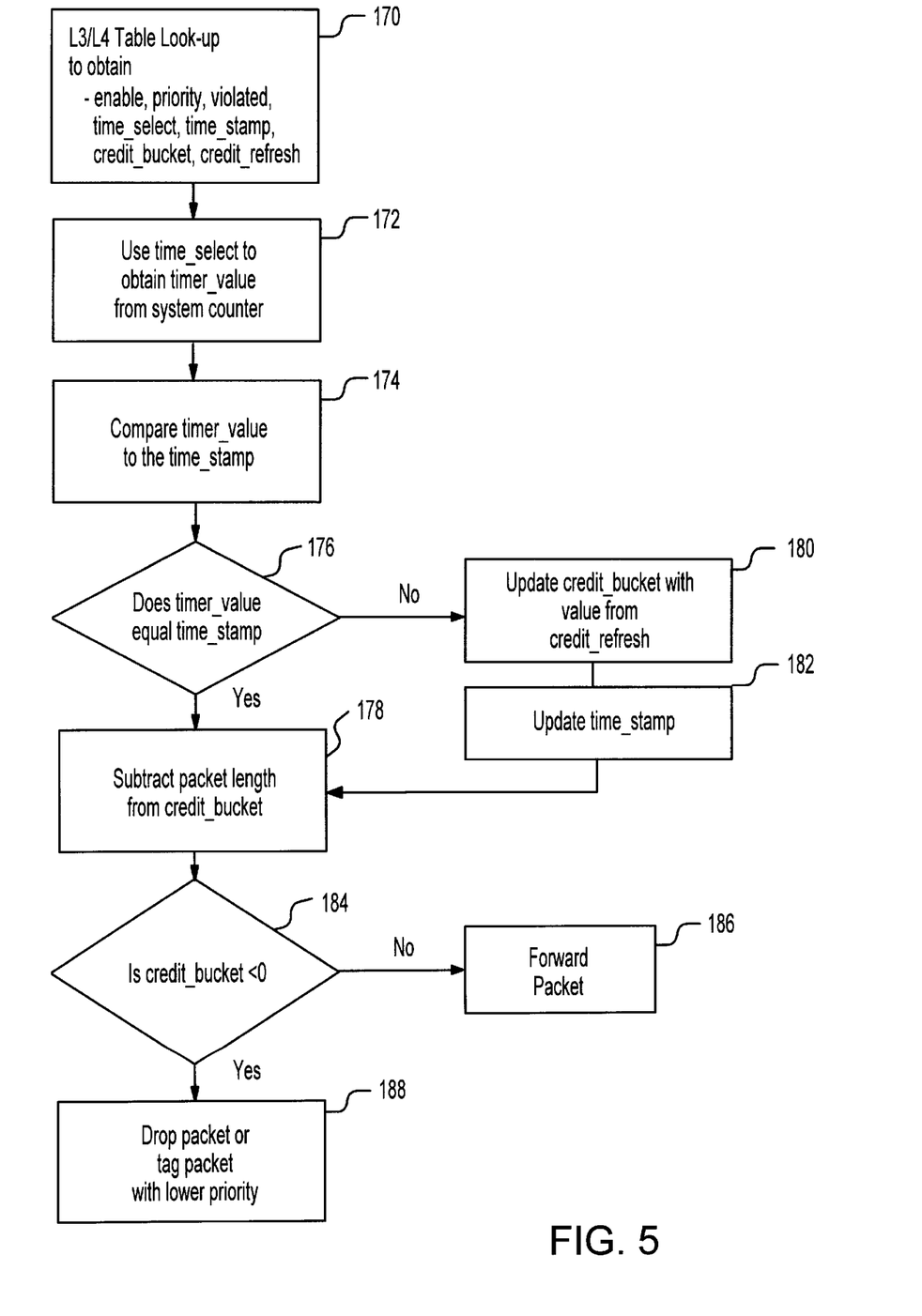
FIG. 5 is a flow diagram of a preferred method for controlling the flow of packets that utilizes a credit bucket algorithm in accordance with the invention.

FIG. 5 is a flow diagram of a preferred method of the invention. In the first step 170 of the method, the L3/L4 Table is accessed in a look-up process that utilizes the search index vector generated from layer 3 and layer 4 information from the incoming packet to rapidly locate the table entry that is specific to the flow of which the packet is a part. The table information that includes the enable, the priority, the violated, the time_select, the time_stamp, the credit_bucket, and the credit_refresh fields in addition to the layer 3 and layer 4 information as depicted in FIG. 4 is extracted from the L3/L4 Table. Because layer 4 application protocol information is included in the L3/L4 Table look-up, traffic control decisions can be based on the application protocol in addition to layer 3 IP information.

Figure 6:
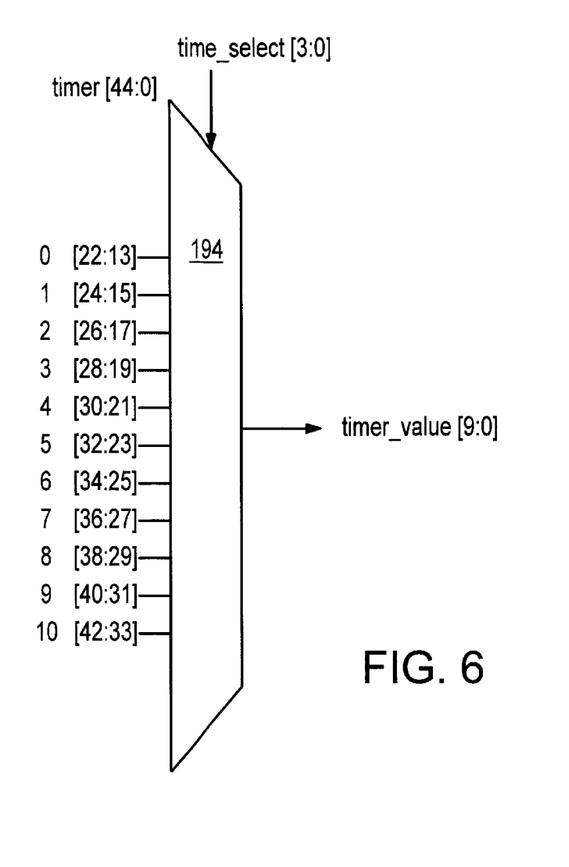
FIG. 6 is a depiction of a time select process for obtaining a timer value in accordance with the invention.
Figure 7:
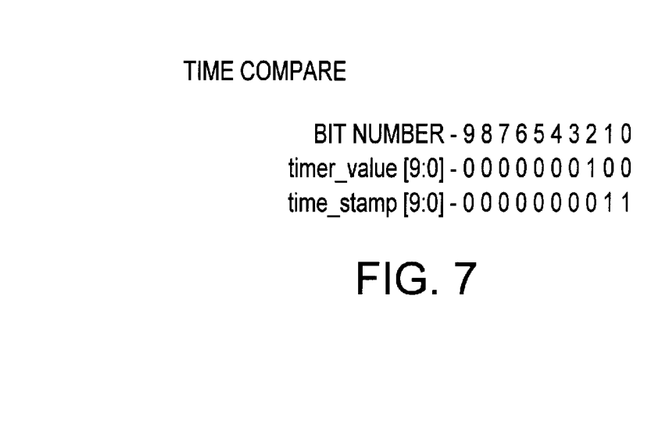
FIG. 7 is an example of a process for comparing a timer_value vector and a time_stamp vector in accordance with the invention.

In a next step 172, if the enable bit is set, the time_select field is used to obtain a timer value (timer-value) from the 45-bit system counter. FIG. 6 is a depiction of how the time_select field is used to obtain a timer_value from the 45-bit system counter. To obtain a timer_value, the 4-bit time_select vector is fed into a multiplexer 194 that enables the identification of one of the eleven timer value groups (numbered from 0 to 10). Depending on the time_select vector, a timer value is output from the multiplexer. In the embodiment of FIG. 6, the timer_value is a 10-bit vector equivalent in size to the 10-bit time_stamp vector. The bit sequences included in each 10-bit vector are shown next to the corresponding group number. Referring back to FIG. 5, in a next step 174, the newly acquired timer_value is compared to the time_stamp that was obtained from the L3/L4 Table look-up. FIG. 7 is a depiction of an example of the time compare process. Since the time_select vector is selected to identify significant bits of the system counter that represent a particular time interval, when the timer_value and time_stamp are not equal, it is determined that the pre-established time interval has expired. In the example, the significant bits of the system counter as represented by the timer_value have advanced beyond the time_stamp, indicating that the pre-established time interval has expired. On the other hand, if the timer_value and time_stamp are equal, it is determined that the pre-established time interval has not expired.

Although it is usually the case that the pre-established time interval has not expired when the timer_value and time_stamp are equal, there is one instance in which the time interval has expired even though the time_stamp and timer_value are equal. It is possible that the timer_value can equal the time_stamp because the timer_value has cycled completely through the 10-bit vector and has in essence wrapped around back to the starting value. This problem is known as "wrap around error" and when it occurs, it prevents the credit bucket from being refreshed at its pre-established time interval. Wrap around error is virtually unavoidable when using time stamps and timer values of a finite number of bits.

Figures 8, 9:
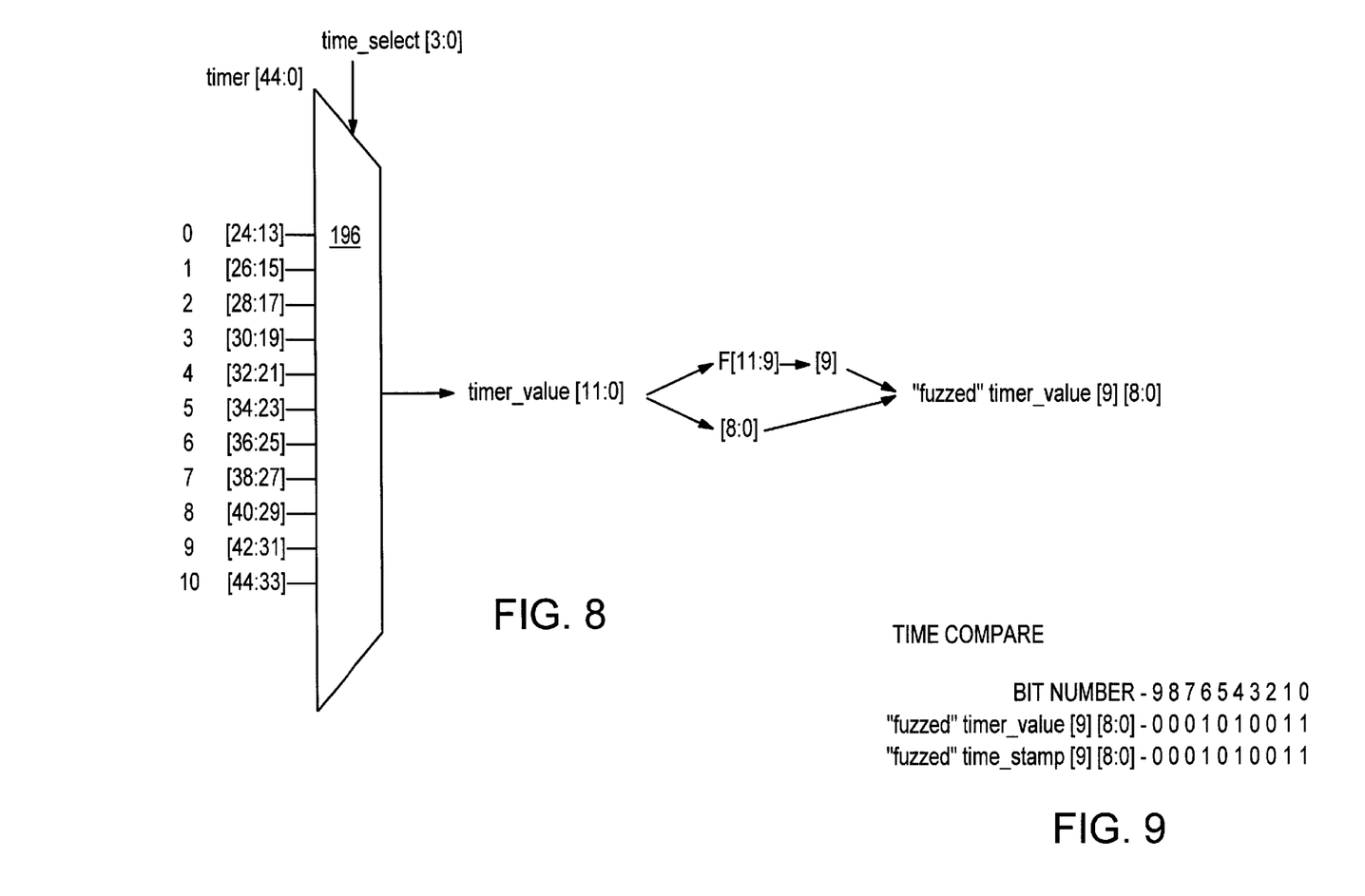
FIG. 8 is a depiction of a time select process for generating a "fuzzed" timer_value in accordance with the invention.
FIG. 9 is an example of a process for comparing a "fuzzed" timer_value vector and a "fuzzed" time_stamp vector in accordance with the invention.

In order to minimize the case where a flow of packets is falsely limited to a value of an old credit bucket because of wrap around error, a preferred approach to generating the timer_value vector is utilized. The preferred approach to generating the timer-value vector is depicted in FIG. 8. In accordance with the approach, the time_select vector is input into the multiplexer 196 to select a 12-bit timer_value instead of a 10-bit timer_value. The upper 3 bits (bits 9 through 11) of the timer_value are then run through a "fuzz" function that outputs 1-bit. The 1-bit is attached to the lower 9 bits of the timer_value to create a new 10-bit "fuzzed" timer_value that is compared to a "fuzzed" time_stamp that is obtained from the look-up process. The "fuzz" function is designed to cause the new timer_value to wrap around the time_stamp in an alternating cadence that varies by a factor of three. Table 2 shows the input vector possibilities and the output bit that is added to the lower 9 bits of the timer_value to create the new "fuzzed" timer_value. Implementing the "fuzz" function provides some additional protection from a theoretical pathological case of binary back-off hitting the exact cadence of the time_stamp wrap around.

TABLE 2

TIMER VALUE "FUZZ" FUNCTION

| timer[11] | timer[10] | timer[9] | time_stamp[9] |
|---|---|---|---|
| 0 | 0 | 0 | 1 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 0 |

An example time compare process that compares a "fuzzed" timer_value to a "fuzzed" time_stamp is depicted in FIG. 9. In the example, the "fuzzed" timer value and the "fuzzed" time stamp are equivalent and therefore the pre-established time interval has not expired. It should be noted that the timer_value and time_stamp are only ten relevant bits from a 45-bit timer and accordingly many of the lower bits in the counter may be different between a timer_value and a time stamp but the time intervals represented by the lower bits are too small to be significant to the particular time interval.

For example, if the time interval of concern is in minutes, it is not necessary to know how many microseconds have elapsed and therefore the lower bits registering microseconds can be disregarded.

Referring back to logic point 176 in FIG. 5, if the timer_value obtained using the time_select from the L3/L4 Table entry is equal to the time_stamp from the same L3/L4 Table entry (indicating that the current time interval has not expired), then step 178 is performed next. In step 178, the size of the packet that initiated the L3/L4 Table look-up is subtracted from the size of the credit_bucket that was obtained from the L3/L4 Table at step 170. In the preferred embodiment, each credit in the credit bucket is equivalent to 32 bytes. The size of the packet in bytes is converted into 32-byte switching blocks and the number of switching blocks of the packet is subtracted from the number of credits in the credit_bucket.

On the other hand, if the timer_value is not equal to the time_stamp (indicating that the current time interval has expired), then at step 180 the number of credits available in the credit_bucket is updated or "refreshed" to the credit_refresh value that was obtained from the L3/L4 Table. Since the credit_refresh field is a 12-bit vector, the credit_refresh value can be one of $2^{12}$ or 4,096 different values.

After refreshing the credit_bucket at step 180, in a next step 182, the time_stamp is updated. Since the current time interval has expired, the time_stamp must be updated to track a new time interval related to packets from the same flow. In order to properly track the new time interval, the just-used time_stamp is replaced with an updated time_stamp that reflects the time of the current L3/L4 Table access. The updated time_stamp may simply be the 10-bit timer_value that was just used for the time comparison or, preferably, the updated time stamp is the 10-bit "fuzzed" timer_value generated using the function as described above. Although the timer_value and the time_stamp vectors are described as 10-bit vectors, vector length is not critical to the invention, as long as relevant time intervals can be effectively measured.

Referring back to FIG. 5, as in the case where the time interval has not expired, in step 178 the size of the awaiting packet is subtracted from the credit_bucket that has just been refreshed. Again, the size, or length, of a packet is measured in 32-byte switching blocks and each available credit allows the release of one switching block. Packets are not released incomplete, so the total number of switching blocks in a packet must be subtracted from the credit_bucket.

At logic point 184, the subtracted value of the credit_bucket is compared to 0 and if the credit_bucket value is greater than or equal to 0, at step 186 the packet is forwarded on to be processed through the multi port switch. Upon packet forwarding, an updated credit_bucket value is sent back to the L3/L4 Table to be utilized in conjunction with additional packets from the same flow. If, on the other hand, the credit_bucket value is less than 0, at step 188 the entire packet is either dropped from the switch or tagged with a lower priority, depending on which option is identified by the priority field.

Figure 10:
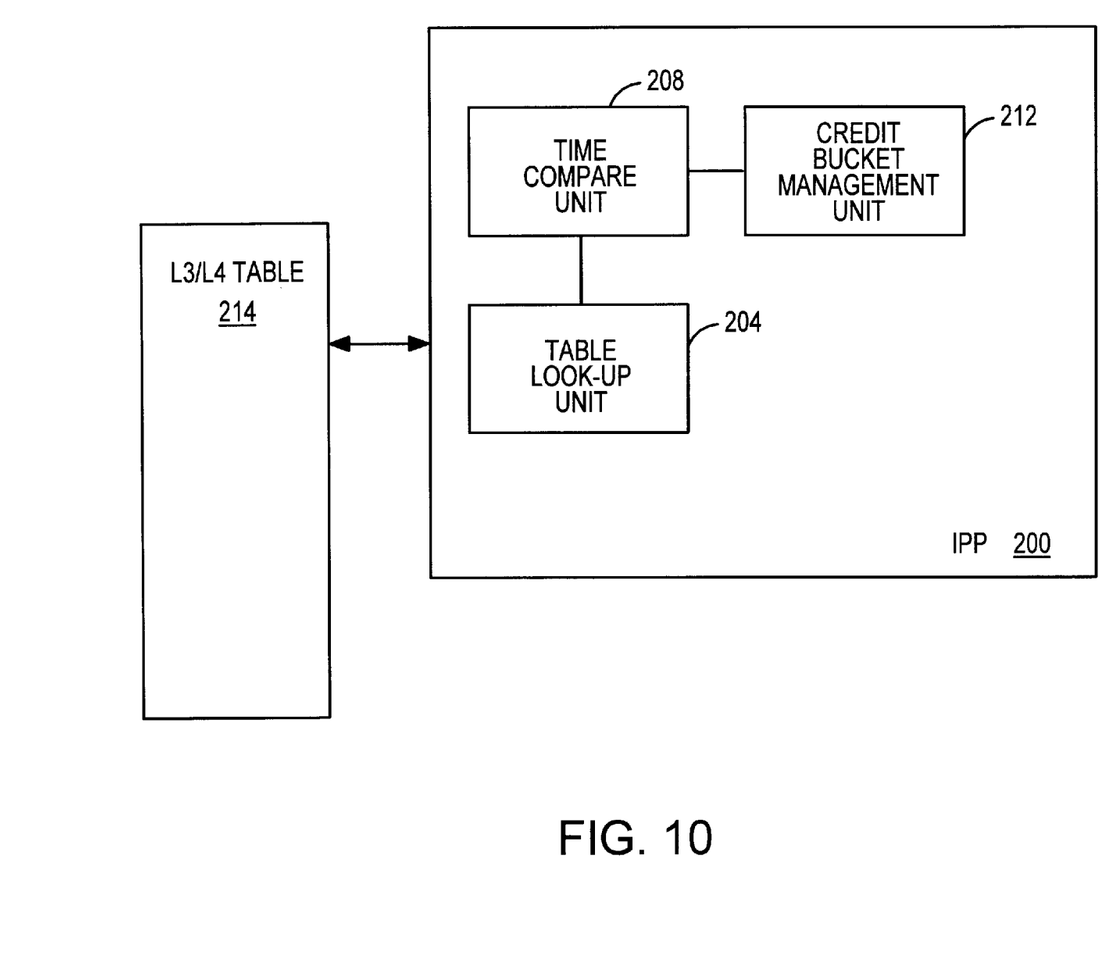
FIG. 10 is a depiction of a memory and an IPP ASIC including the preferred functional units embedded within the IPP in accordance with the invention.

In the preferred embodiment, the functions described with reference to FIG. 5 are performed in functional units residing within each IPP 200 as depicted in FIG. 10. The L3/L4 Table 214 look-up is performed by the Table Look-up Unit 204. The steps of obtaining the timer_value, generating the "fuzzed" timer_value, and comparing the timer_value to the time_stamp are performed within the Time Compare Unit 208. The steps of refreshing the credit_bucket, subtracting a packet length from the credit_bucket, and determining the release of a packet are performed within the Credit Bucket Management Unit 212. Each of the functional units is preferably formed from logic that is embedded within the IPP ASIC. Embedded devices used to perform the functions include conventional logic devices, such as multiplexers, comparitors, adders, and subtractors. Because the logic of the functional units is embedded into the ASIC, the functions can be performed much faster than traditional systems which utilize multipurpose processors and software to manipulate packet information, particularly layer 4 information concerning the application protocol.

In the preferred embodiment, the credit bucket algorithm is implemented as a "use it or lose it" algorithm. That is, if there are leftover credits in the credit_bucket at the expiration of the given time interval, the credits are not carried over into subsequent time intervals. The credit_bucket is refreshed exactly to the limit value in the credit_refresh field. The effect of the use-it-or-lose-it approach is to make a hard maximum limit that is dynamically enforced over a short period of time (one interval), though this can be adjusted, as will be discussed below.

Utilizing the preferred use-it-or-lose-it approach described above, bandwidth policing can be fine tuned by adjusting one or both of the time select value and the credit_refresh value. For example, if the time interval as dictated by the time_select vector is shortened, the credit_bucket will be refreshed more often and more packets can be released. Similarly, if the credit_refresh value is increased, then the number of credits available per time interval will increase and consequently, more packets can be released. Having a system that allows two degrees of freedom of adjustability enables the system to dictate different types of flow characteristics.

Table 3 represents the preferred eleven timing intervals that are identified by the time_select vector. The time intervals are different by a factor of four (two bits) system clock periods. Referring to time_select 0 on Table 2 and time_select 0 on FIG. 6, it can be seen that the timer_value begins on bit number 13 of the 45-bit system counter such that each flip of bit number 13 represents 8,192 clock periods. In a 50 MHz clock, each flip of bit number 13 represents a corresponding time interval of 163.84 $\mu$s. The number of clock periods and the corresponding time intervals are tabulated for both a 50 MHz and a 62.5 MHz clock system for the preferred time_select values 0 through 10.

TABLE 3

TIME SELECT VALUES

| Time Select [3:0] | Number of System clock periods | 50 MHz (20 ns clock period) | 62.5 MHz (16 ns clock period) |
|---|---|---|---|
| 0 | 2^13 = 8,192 | 163.84 $\mu$s | 131.07 $\mu$s |
| 1 | 2^15 = 32,768 | 655.36 $\mu$s | 524.29 $\mu$s |
| 2 | 2^17 = 131,072 | 2.62 ms | 2.10 ms |
| 3 | 2^19 = 524,288 | 10.49 ms | 8.39 ms |
| 4 | 2^21 = 2,097,152 | 41.94 ms | 33.55 ms |
| 5 | 2^23 = 8,388,608 | 167.77 ms | 134.22 ms |
| 6 | 2^25 = 33,554,432 | 671.09 ms | 536.84 ms |
| 7 | 2^27 = 1.34218e + 08 | 2.68 seconds | 2.15 seconds |
| 8 | 2^29 = 5.36871e + 08 | 100.74 seconds | 8.59 seconds |
| 9 | 2^31 = 2.14748e + 09 | 42.95 seconds | 34.36 seconds |
| 10 | 2^33 = 8.58993e + 09 | 171.80 seconds | 137.44 seconds |

Table 4 represents some of the 4,096 possible credit_refresh values that can be generated by the 12-bit credit_refresh field. In addition, the table represents the corresponding number of switching blocks and the corresponding number of bytes that are represented by identified credit_refresh values. The 12-bit credit_refresh vector can generate 4,096 credit_refresh values which represent credit_bucket values ranging from 0 bytes to 524,160 bytes.

TABLE 4

REFRESH VALUES AND CORRESPONDING CREDIT BUCKET VALUES

| credit_refresh value [11:0] | Number of Switch Blocks (refresh * 4) | credit_bucket value in Number of Bytes (blocks * 32) |
|---|---|---|
| 0 | 0 | 0 |
| 1 | 4 | 128 |
| 2 | 8 | 256 |
| 3 | 12 | 384 |
| . | . | . |
| . | . | . |
| . | . | . |
| 16 | 64 | 2,048 |
| . | . | . |
| . | . | . |
| . | . | . |
| 21 | 84 | 2,688 |
| . | . | . |
| . | . | . |
| 64 | 256 | 8,192 |
| . | . | . |
| . | . | . |
| 84 | 336 | 10,752 |
| . | . | . |
| . | . | . |
| 256 | 1,024 | 32,768 |
| . | . | . |
| . | . | . |

TABLE 4-continued

REFRESH VALUES AND CORRESPONDING CREDIT BUCKET VALUES

| credit_refresh value [11:0] | Number of Switch Blocks (refresh * 4) | credit_bucket value in Number of Bytes (blocks * 32) |
|---|---|---|
| 336 | 1,344 | 43,008 |
| . | . | . |
| . | . | . |
| . | . | . |
| 1,024 | 4,096 | 131,072 |
| . | . | . |
| . | . | . |
| . | . | . |
| 1,342 | 5,368 | 171,776 |
| . | . | . |
| . | . | . |
| . | . | . |
| 2,048 | 8,192 | 262,144 |
| . | . | . |
| . | . | . |
| . | . | . |
| 4,095 | 16,380 | 524,160 |

In a preferred embodiment, the time_select values and credit_refresh values are selected to overlap, such that more than one combination of the two parameters may be used to achieve similar bandwidth limits. By using a smaller time interval and a credit_refresh that amounts to only a few packets, a bandwidth limit becomes very strict, clamping down on violating flows within a few packets of violating the bandwidth allocation. Strict limits are desirable when trying to avoid overflowing output buffers, but the limits come at a potential cost of significant error when a packet only slightly exceeds the available credit value yet is dropped according to the algorithm. If more flexibility in flow is desired, a larger time interval can be selected, with a corresponding larger credit_refresh value. A larger credit_refresh value allows packet bursts that exceed the ideal bandwidth limit to pass while still constraining the average flow rate to within the desired limit. In bursty network traffic environments, it may be best to have larger time intervals and bucket sizes to accommodate bursts and to reduce losses.

Table 5 contains some examples of rate limits that are formed using different combinations of time intervals and bucket sizes for a system with a 50 MHz clock. In the table, four different combinations of time_select values and credit_refresh values are used to create an 8-Kilobits per second (Kbps) rate limit. For example, in the top row, the 4-bit time_select vector identifies time_select number 10 which corresponds to a time interval of 171.80 seconds. The 12-bit credit_refresh vector identifies the refresh value 1,342 which when multiplied by four (the number of switching blocks per credit_refresh value) and by thirty-two (the number of bytes per switching block) equals a total number of 171,776 bytes. In this 8-Kbps rate limit, 171,776 bytes can be released during each 171.80 second time interval.

TABLE 5

RATE LIMITS EXAMPLES

| time select [3:0] | credit_refresh [11:0] | Rate Limit |
|---|---|---|
| 10 (171.80 seconds) | 1,342 (171,776 bytes) | 7.999 Kbps |
| 9 (42.95 seconds) | 336 (43,088 bytes) | 8.011 Kbps |
| 8 (10.74 seconds) | 84 (10,752 bytes) | 8.011 Kbps |
| 7 (2.68 seconds) | 21 (2,688 bytes) | 8.011 Kbps |
| 3 (10.49 ms) | 1,024 (131,072 bytes) | 100.000 Mbps |
| 2 (2.62 ms) | 256 (32,768 bytes) | 100.000 Mbps |
| 1 (655.36 $\mu$s) | 64 (8,192 bytes) | 100.000 Mbps |
| 0 (163.84 $\mu$s) | 16 (2,048 bytes) | 100.000 Mbps |

Also in Table 5, four different combinations of time intervals and bucket sizes are used to create 100 Mbps rate limits. For example, in the bottom row, the 4-bit time_select vector identifies time_select number 0, which corresponds to a time interval of 163.84 $\mu$s. The 12-bit credit_refresh vector identifies the refresh value 16, which when multiplied out is equal to 2,048 bytes. In this 100 Mbps rate limit, 2,048 bytes can be released during each 163.84 $\mu$s time interval. Using the time_select and credit_refresh values as disclosed, there are several combinations of the two parameters that can be used to create bandwidth limits ranging from below 8 Kbps to over 1 Gbps.

The manipulation of the time_select values and credit_refresh values is preferably accomplished through software that has a graphical user interface (GUI). For instance, to control a specific flow, a user can identify, through the GUI, a source of a particular flow and a destination of a particular flow, in addition to the application protocol of the flow. As an example, a bandwidth limit is assigned to a flow as follows: HTTP data from source A to destination B should be rate limited to 56 Kbps. The system processor translates the information input through the GUI into network protocol information such as the IP source and destination addresses and the TCP application protocol port number. The system processor converts the designated bandwidth limit into the appropriate time_select and credit_refresh values and the designated flow is controlled as described.

The parameters of flow control can vary widely. For example, only certain applications can be controlled, or only certain sources can be controlled by manipulating the L3/L4 Table entries. In addition, the time of day and day of the week for bandwidth control can be specified. Because the L3/L4 Table contains information concerning the TCP application protocol port number that is available to be accessed at data link speeds, flows through the multi port switch can be controlled based on specific layer 4 application information in addition to all of the traditional layer 3 parameters at data link speeds. Controlling flows based on the application protocol enables network devices to manage network resources that have been reserved according to emerging resource reservation protocols such as RSVP.

Although the preferred embodiment does not provide any aggregate count of rate-limited packets (packets that were dropped or had their priority lowered), the feature could be added at some hardware expense. Additionally, although the functions of the multi port switch and particularly the IPPs have been specifically described, it is important to note that the functional units are not limited to the physical boundaries as described. For example, the IPP is preferably one device, however, it may consist of more than one device with distributed functional responsibilities. Further, the rate limit information accessed in the L3/L4 Table could be accessed instead in the layer 2 look-up.

An advantage of the invention is that with a few carefully chosen bits, a bandwidth policing mechanism is provided that is effective in enforcing maximum limits on a per-flow basis with an acceptable level of error for a typical packet. The range of sizes in the credit bucket coupled with the sliding time scale yields a flexible mechanism that can be tuned to allow relatively large bursts (up to several max-sized TCP windows of 64-Kilobytes) through the switch or to clamp down on violating flows within a handful of packets.

One source of error in the system is generated by the fact that the credit limit is checked on a packet-by-packet basis and, therefore, if there are not enough credits available for an entire packet, the entire packet is dropped or tagged. Dropping entire packets may result in enforced rate limits being less than the rate specified by the time_select and credit_refresh values. The error is proportional to the ratio of the size of the packet divided by the size of the credit_refresh value. The error is worst for small credit_refresh values and a large packet that exceeds the credit_bucket by one byte. If the credit_refresh is only five of the large packets in size, the error in this case is one packet out of five packets, or approximately 20%. If the credit_refresh is forty of the large packets, then the error goes down to one packet out of forty packets, or approximately 2.5%. For best results, there should always be a time_select and credit_refresh size combination available for any bandwidth limit that uses a credit size greater than forty maximum-size packets, where the maximum size is determined by system constraints which may include layer 2 protocol (i.e., ethernet) or other factors.

Another source of error is related to the number of bits allocated to the credit_bucket and credit_refresh fields and the associated resolutions of each. In the preferred embodiment, the resolutions of these fields are 32 bytes and 128 bytes, respectively. Packets that are not an integral number of 32-byte switching blocks have their lengths rounded to the closest number of blocks, resulting in an overcounting or undercounting of actual credits used. The error is worst for small packets of sizes in between two integral numbers of 32-byte switching blocks, but in any case the overall error in the measurement of bandwidth utilization will tend to zero for a flow of randomly variable sized packets. The resolutions of the credit_bucket and credit_refresh fields could be reduced to smaller values by adding more bits to the fields, which in turn reduces the associated error. For example, the resolution of the credit_bucket field could be reduced to 1-byte by increasing the field from 14 bits to 19 bits. This is a tradeoff between improving the accuracy level and conserving bits in the L3/L4 Table.

The preferred implementation of the use-it-or-lose-it credit bucket algorithm functions to enforce a peak traffic rate over each time interval. In an alternative embodiment of the invention, the credit bucket algorithm is implemented to accumulate unused credits from each time interval on a flow-by-flow basis. An accumulating credit bucket allows the enforcement of an average traffic rate over a longer period of time with the ability to accommodate for occasional burstiness. Implementing an accumulating credit bucket algorithm may cost more bits in the credit_bucket field to enable the credit_bucket field to accumulate more credits.

In another alternative embodiment, a use-it-or-lose-it credit bucket algorithm and an accumulating credit bucket algorithm are implemented in tandem to achieve maximum rate limit control and average rate limit control. While this implementation provides a higher level of rate control, it comes at the expense of more bits in the L3/L4 Table and more embedded hardware devices.

What is claimed is:

1. A method of controlling the flow of variable-length packets on data links connected to a multiport switch comprising steps of:

receiving a packet that includes packet-specific header information at said multiport switch;

accessing a memory that contains forwarding information, said forwarding information including bandwidth management information;

searching said memory based on transmission control protocol, TCP, or user datagram protocol, UDP, information, and internet protocol, IP, or internet packet exchange, IPX, information found within said packet-specific header information of said packet;

locating, in said memory, forwarding information that is related to said packet;

extracting bandwidth management information from said forwarding information that is related to said packet, wherein said bandwidth management information includes a bandwidth consumption limit that is relevant to forwarding said packet;

comparing said extracted bandwidth management information to said packet;

forwarding said packet within said multiport switch when said comparison indicates that forwarding said packet will not exceed said bandwidth consumption limit; and dropping said packet from said multiport switch or tagging said packet with an adjusted priority before forwarding of said packet within said multiport switch when said comparison indicates that forwarding said packet will exceed said bandwidth consumption limit.

2. The method of claim 1 wherein said bandwidth management information is based at least partially on an identification of an application protocol within said TCP or UDP information.

3. The method of claim 2 wherein the step of comparing includes steps of:

determining if a pre-established time interval has expired by comparing the time said packet was received by said multiport switch to a last time that said forwarding information related to said packet was accessed;

refreshing a credit bucket included within said bandwidth management information if said pre-established time interval has expired;

comparing said credit bucket, whether refreshed or not, to said packet; and forwarding said packet through said multiport switch if said credit bucket contains a number of credits that represents at least the quantity of data in said packet.

4. The method of claim 3 further including the step of adjusting one of said pre-established time interval and the size of said credit bucket included within said bandwidth management information to change a characteristic of a flow of variable-length packets.

5. An apparatus for controlling a flow of variable-length packets through a multiport switch comprising:

means for receiving a packet that is part of said flow of variable-length packets wherein said packet includes packet-specific header information related to layer 3 and layer 4 protocols;

memory having searchable registers that store flow-specific packet forwarding information including application protocol information contained in said layer 4 protocol;

means for locating, within said memory, flow-specific packet forwarding information specific to said flow of variable-length packets that said received packet is part of, based at least partially on said application protocol information;

means, formed in circuitry that is specific to packet flow control, for comparing the time said received packet arrived in said switch to the time that said flow-specific packet forwarding information specific to said flow was previously accessed by another packet to determine if a pre-established time interval has expired;

means, formed in circuitry that is specific to packet flow control, for comparing a credit bucket value that indicates a maximum size packet to the size of said received packet and for forwarding said received packet when the size of said received packet is less than or equal to said credit bucket value that indicates said maximum size packet, and for dropping or limiting said forwarding of said received packet when said received packet is larger than said credit bucket value that indicates said maximum size packet; and means for decrementing said credit bucket value each time a packet from said flow of variable-length packets is forwarded and for refreshing said credit bucket value back to a pre-established credit bucket value each time it is determined that said pre-established time interval has expired.

6. The apparatus of claim, 5 wherein said means for locating, said means for comparing the time, said means for comparing said credit bucket value, and said means for decrementing are formed within the physical boundaries of a single application-specific integrated circuit.

7. The apparatus of claim, 6 further including a direct data connection between said memory and said single application-specific integrated circuit.

8. The apparatus of claim, 5 further including a means for selecting bits from a system counter that are representative of said pre-established time interval.

9. A method of controlling the flow of variable-length packets through a transmission control protocol, TCP, and internet protocols, IP, compatible multiport switch wherein said variable-length packets include layer 2, layer 3, and layer 4 header information comprising the steps of:

receiving a packet of a particular length within said multiport switch;

stripping layer 2 header information from said packet;

accessing a memory that contains flow-specific information;

utilizing layer 3 and layer 4 header information from said received particular length packet to look-up flow-specific information in said accessed memory;

comparing said flow-specific information to the length of said particular length packet and to a clock value that is representative of the time that said packet was received by said multiport switch; and forwarding said particular length packet through said multiport switch if the length of said particular length packet does not exceed a maximum packet length as determined by a credit bucket indicator included within said flow-specific information.

10. The method of claim 9 further including the step of adjusting said maximum packet length to a preselected length represented by a credit refresh indicator included within said flow-specific information when said clock value indicates that a preselected time interval represented by a time select indicator included within said flow-specific information has expired.

11. The method of claim 10 further including the step of adjusting said preselected time interval or said maximum packet length to change a characteristic of the flow of variable-length packets through said multiport switch.

12. The method of claim 9 further including the step of adding a preselected credit value to said credit bucket indicator each time a preselected time interval has expired.

13. A method of controlling the flow of variable-length packets on data links connected to a multiport switch comprising steps of:

receiving a packet that includes packet-specific header information at said multiport switch;

accessing a memory that contains forwarding information, said forwarding information including bandwidth management information;

searching said memory based on said packet-specific header information of said packet;

locating, in said memory, forwarding information that is related to said packet;

extracting bandwidth management information from said forwarding information that is related to said packet, and isolating a time select vector that indicates significant bits of a system counter and determines a pre-established time interval, wherein said bandwidth management information includes a bandwidth consumption limit that is relevant to forwarding said packet;

comparing said extracted bandwidth management information to said packet;

forwarding said packet within said multiport switch when said comparison indicates that forwarding said packet will not exceed said bandwidth consumption limit; and dropping said packet from said multiport switch or tagging said packet with an adjusted priority before forwarding of said packet within said multiport switch when said comparison indicates that forwarding said packet will exceed said bandwidth consumption limit.

14. The method of claim 13 wherein said step of extracting bandwidth management information includes a step of isolating a time stamp vector that indicates when said forwarding information was last accessed.

15. The method of claim 14 wherein said step of extracting bandwidth management information includes a step of isolating a credit_bucket vector that represents a maximum amount of data that can be forwarded in a remaining portion of a current time interval, wherein said current time interval is initially equal to said pre-established time interval.

16. The method of claim 15 wherein said step of extracting bandwidth management information includes a step of isolating a credit_refresh vector that represents a maximum amount of data that can be forwarded in said pre-established time interval.

17. The method of claim 16 wherein said step of comparing said bandwidth management information includes steps of:

utilizing said time select vector that indicates significant bits of a system counter to obtain a clock vector that represents an arrival time of said packet;

comparing said clock vector to said time stamp vector that indicates when said forwarding information was last accessed to determine if said pre-established time interval has expired;

if said pre-established time interval has not expired, comparing said credit bucket vector to said packet and forwarding said packet if said packet is within said maximum amount of data that can be forwarded; and if said pre-established time interval has expired, updating said bandwidth consumption limit according to said credit_refresh vector and comparing said updated bandwidth consumption limit to said packet to determine if said packet is within said updated bandwidth consumption limit and forwarding said packet if said packet is within said updated bandwidth consumption limit.

18. The method of claim 17 further including a step of updating said credit bucket vector when said packet is forwarded within said switch and if said pre-established time interval has not expired.

19. The method of claim 17 further including the step of updating said credit bucket vector with said credit_refresh vector when said pre-established time interval has expired.

* * * * *